United States Patent [19]

Endo et al.

[11] Patent Number: 5,761,944
[45] Date of Patent: Jun. 9, 1998

[54] PUNCHING PROCESSING METHOD AND ROLL FORMING DIE USED IN THIS PROCESSING METHOD

[75] Inventors: Shigeru Endo, Hadano; Hideyuki Miyake, Odawara, both of Japan

[73] Assignee: Amada Metrecs Company, Limited, Kanagawa, Japan

[21] Appl. No.: 692,621

[22] Filed: Aug. 6, 1996

[30] Foreign Application Priority Data

Aug. 9, 1995 [JP] Japan .................... 7-203522

[51] Int. Cl.$^6$ .......................... B21B 39/02
[52] U.S. Cl. .................................. 72/133
[58] Field of Search ................ 72/133, 179, 175, 72/182, 226; 83/549

[56] References Cited

U.S. PATENT DOCUMENTS

| | | |
|---|---|---|
| 4,696,211 | 9/1987 | Bitzel. |
| 5,555,759 | 9/1996 | Rosene et al. ............. 72/179 |

FOREIGN PATENT DOCUMENTS

| | | |
|---|---|---|
| A-178640 | 4/1986 | European Pat. Off. . |
| A-417836 | 3/1991 | European Pat. Off. . |
| A-530649 | 3/1993 | European Pat. Off. . |
| A-1547466 | 11/1968 | France . |
| U-9418810 | 3/1995 | Germany . |
| 1-8376 | 3/1989 | Japan . |
| 4-10220 | 1/1992 | Japan . |
| A-9621530 | 7/1996 | WIPO . |

*Primary Examiner*—Lowell A. Larson
*Assistant Examiner*—Rodney Butler
*Attorney, Agent, or Firm*—Wigman, Cohen, Leitner & Myers, P.C.

[57] ABSTRACT

In a punching processing method, a punch chip having a roller shape is arranged in a punch chip holder rotatable around the vertical axis and can be rotated around the horizontal axis. A die chip having a roller shape is arranged in a die chip holder rotatable around the vertical axis and can be rotated around the horizontal axis. Punching processing of a work is performed, in cooperation with the punch chip and the die chip, by moving the work in the horizontal direction in a state in which the work is held between the punch chip and the die chip. Further, a roll forming die used in this punching processing method is also proposed. Accordingly, it is possible to perform various kinds of punching processings for a short time without causing any seam and easily perform processings of a circle and a curve in addition to processing of only a straight line.

4 Claims, 7 Drawing Sheets

FACE-PUSHING (BURNISHING)

CUTTING

RIB MOLDING (BEADING)

STEPPED BENDING (OFFSET)

V-COINING

PUNCHING PROCESSING METHOD AND ROLL FORMING DIE USED IN THIS PROCESSING METHOD

BACKGROUND OF THE INVENTION

The present invention relates to a punching processing method for performing punching processings such as face-pushing (burnishing), cutting, rib molding (beading), V-coining and stepped bending (offset), etc. with respect to a work, and also relates to a roll forming die used in this processing method.

When a work is conventionally formed by cutting, rib molding (beading), stepped bending (offset) and V-groove coining, etc., the work is processed by using respective dedicated dies as is already well known.

When the cutting processing is performed by the above conventional die for cutting, pursuit processing is performed so that cutting powder is caused in a whiskered shape. Further, a trace at a pursuit time and a seam distortion are caused. Otherwise, it takes time to process the work and the work is vibrated so that a big noise is caused.

When the rib molding processing is performed by a conventional beading die, a trace at a pursuit time and a seam distortion are caused. Further, it takes time to process the work and the work is vibrated so that a big noise is caused.

When the stepped bending processing is performed by a conventional offset die, problems similar to those in the beading processing are caused. Further, punch and die shapes are complicated so that processing cost is increased. Further, when the V-groove coining processing is performed by a conventional coining die, problems similar to those in the beading processing are caused. Further, there is a case in which no continuous line is formed by an error in pursuit pitch.

Each of the above dies is rotated by using an autoindex already well known. However, it is necessary to operate a press every one stroke so that a time loss is great.

SUMMARY OF THE INVENTION

Therefore, an object of this invention is to provide a punching processing method capable of performing various kinds of punching processings for a short time without causing any seam and easily performing processings of a circle and a curve in addition to processing of only a straight line, and provide a roll forming die used in this processing method.

In accordance with the invention of claim 1, the above object can be achieved by a punching processing method in which a punch chip having a roller shape is arranged in a punch chip holder rotatable around the vertical axis and can be rotated around the horizontal axis, and a die chip having a roller shape is arranged in a die chip holder rotatable around the vertical axis and can be rotated around the horizontal axis; said method comprising the step of punching processing of a work which is performed, in cooperation with the punch chip and the die chip, by moving the work in the horizontal direction in a state in which the work is held between the punch chip and the die chip.

In the above construction, the punching processing of the work is performed in cooperation with the punch chip and the die chip. When this punching processing is performed and the work is moved in the horizontal direction in a state in which the work is held between the punch chip and the die chip, the punch chip holder and the die chip holder respectively follow and are rotated around the vertical axis. Further, the punch chip and the die chip follow and are rotated around the horizontal axis. Accordingly, processings of a circle and a curve can be easily performed for a short time without forming any seam in addition to processing of only a straight line.

In accordance with the invention of claim 2, the above object can be also achieved by a roll forming die comprising an upper die constructed by a punch chip holder and a punch chip; the punch chip holder being arranged in a punch driver and rotatable around the vertical axis; the punch chip being arranged in this punch chip holder and having a roller shape rotatable around the horizontal axis; and a lower die constructed by a die chip holder and a die chip; the die chip holder being arranged in a die holder and rotatable around the vertical axis; and the die chip being arranged in this die chip holder and having a roller shape rotatable around the horizontal axis.

In this construction, the punching processing in the claim 1 can be easily performed.

In accordance with the invention of claim 3, return units are respectively detachably attached to said punch driver and said die holder, and are returned to their original positions by releasing pressurization after said punch chip holder and said die chip holder are respectively rotated around the vertical axis.

In this construction, the return units are respectively detachably attached to the punch driver and the die holder. Accordingly, after the punch chip holder and the die chip holder are rotated and pressurization is then released, the punch chip holder and the die chip holder are returned to their origin positions as original positions. Further, the return units can be respectively detached from the punch driver and the die holder and can be replaced with another when necessary.

In accordance with the invention of claim 4, the punch chip and the die chip having a roller shape are exchangeably arranged in said punch chip holder and said die chip holder, respectively.

In this construction, the punch chip and the die chip having a roller shape are respectively exchanged from the punch chip holder and the die chip holder when necessary. Accordingly, various kinds of punching processings can be easily performed.

In accordance with the invention of claim 5, said return units are constructed by a body arranged in said punch driver and said die holder, a rotatable engaging member engaged with said punch chip holder and said die chip holder, and a resilient member for returning the engaging member to its original position after the engaging member is rotated with respect to said body.

In this construction, the engaging member engaged with the punch chip holder and the die chip holder is rotated against biasing force of the resilient member in a state in which the engaging member is pressurized against the body arranged in the punch driver and the die holder. Further, when the pressurization is released, the above engaging member can be automatically returned by the biasing force of the resilient member to an origin position as an original position with respect to the body.

3

Figure 1:
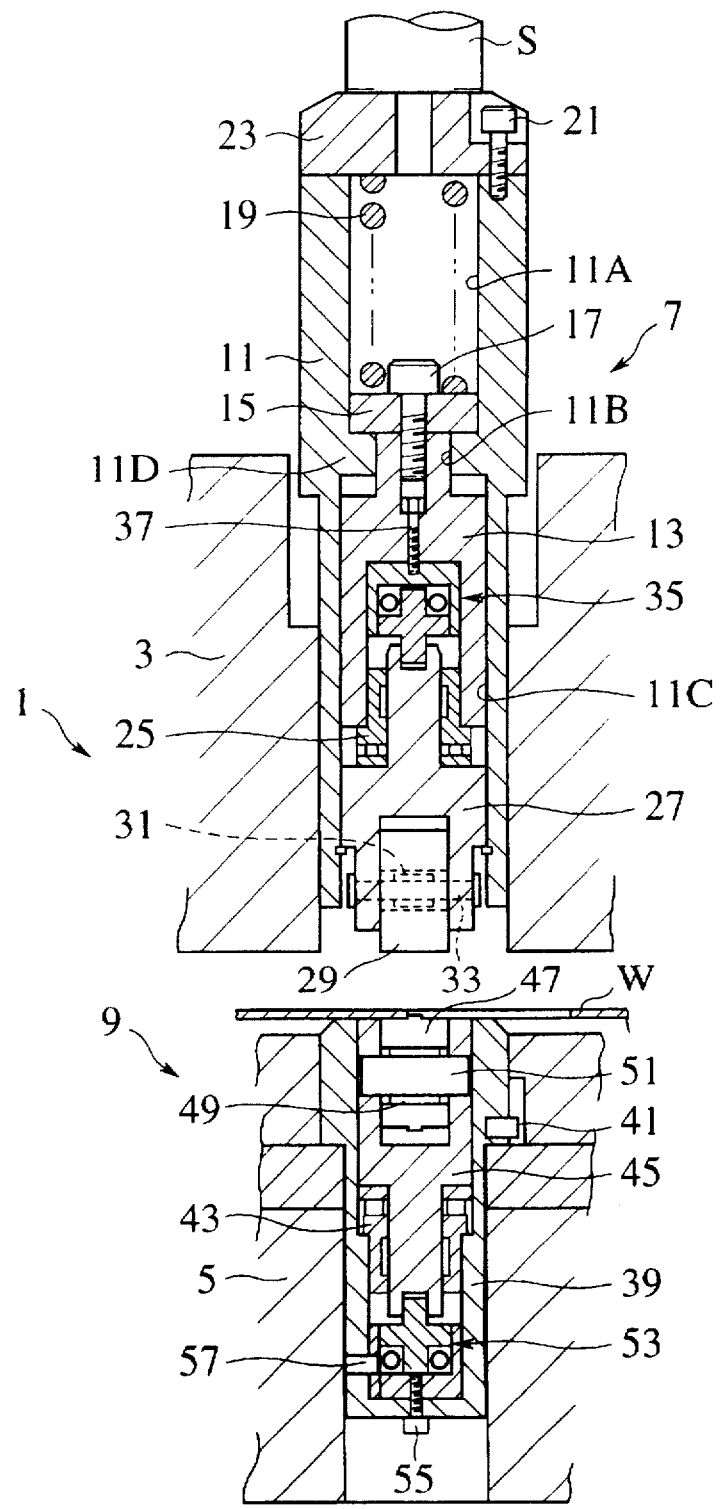
FIG. 1 is a front sectional view of a roll forming die in one embodiment form of this invention.
Figure 2:
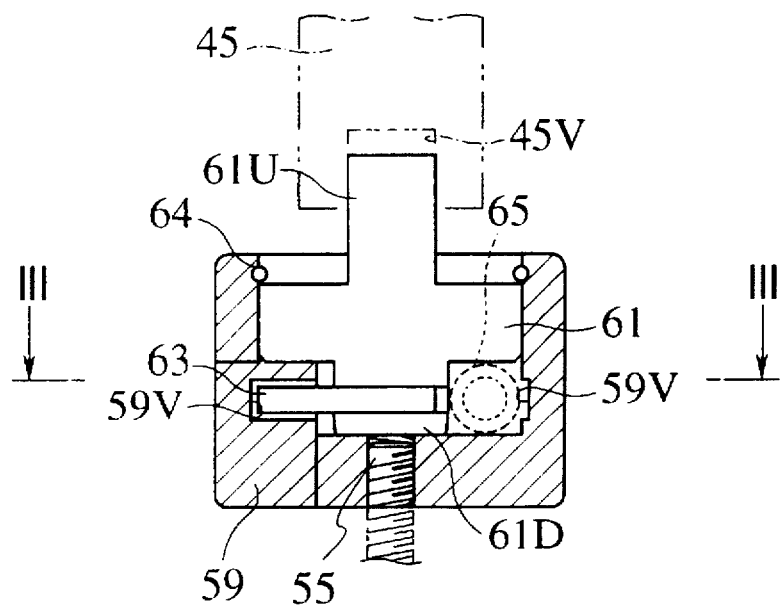
FIG. 2 is a front sectional view of a return unit arranged in a lower die in FIG. 1.
Figure 3:
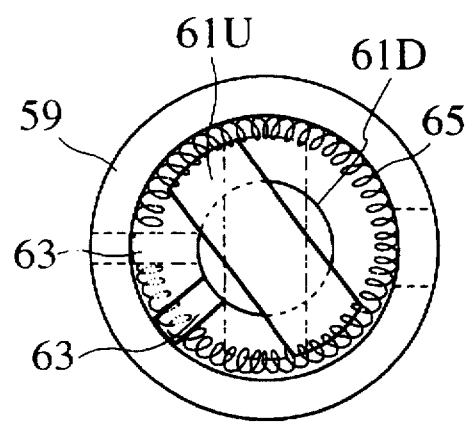
Figure 4:
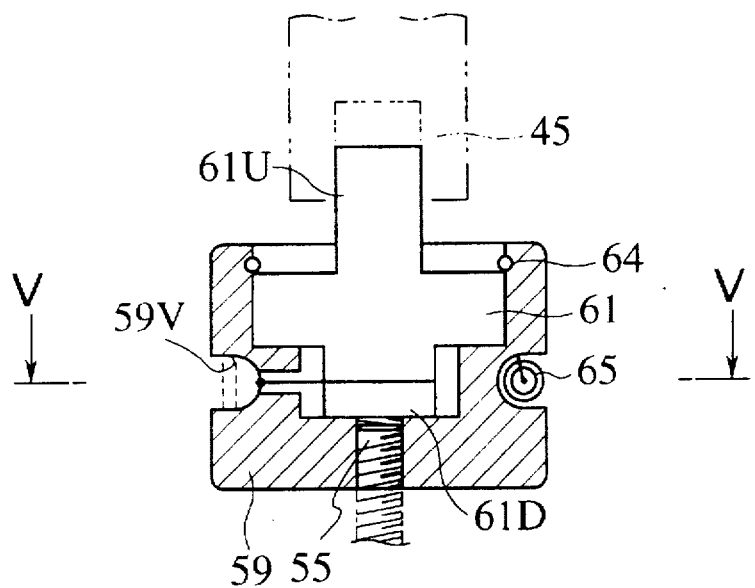
Figure 5A:
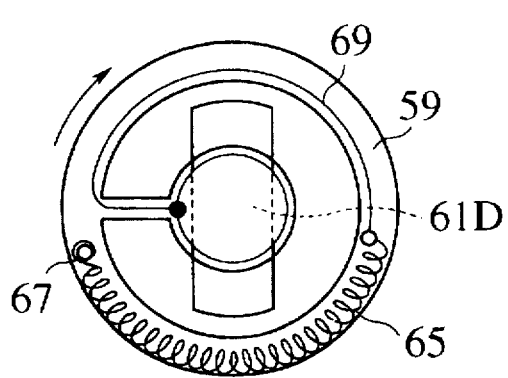
Figure 5B:
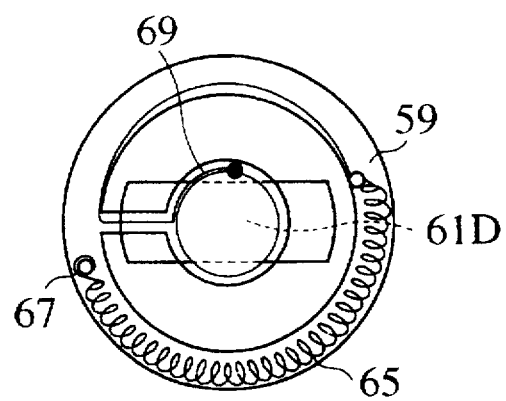
Figure 6:
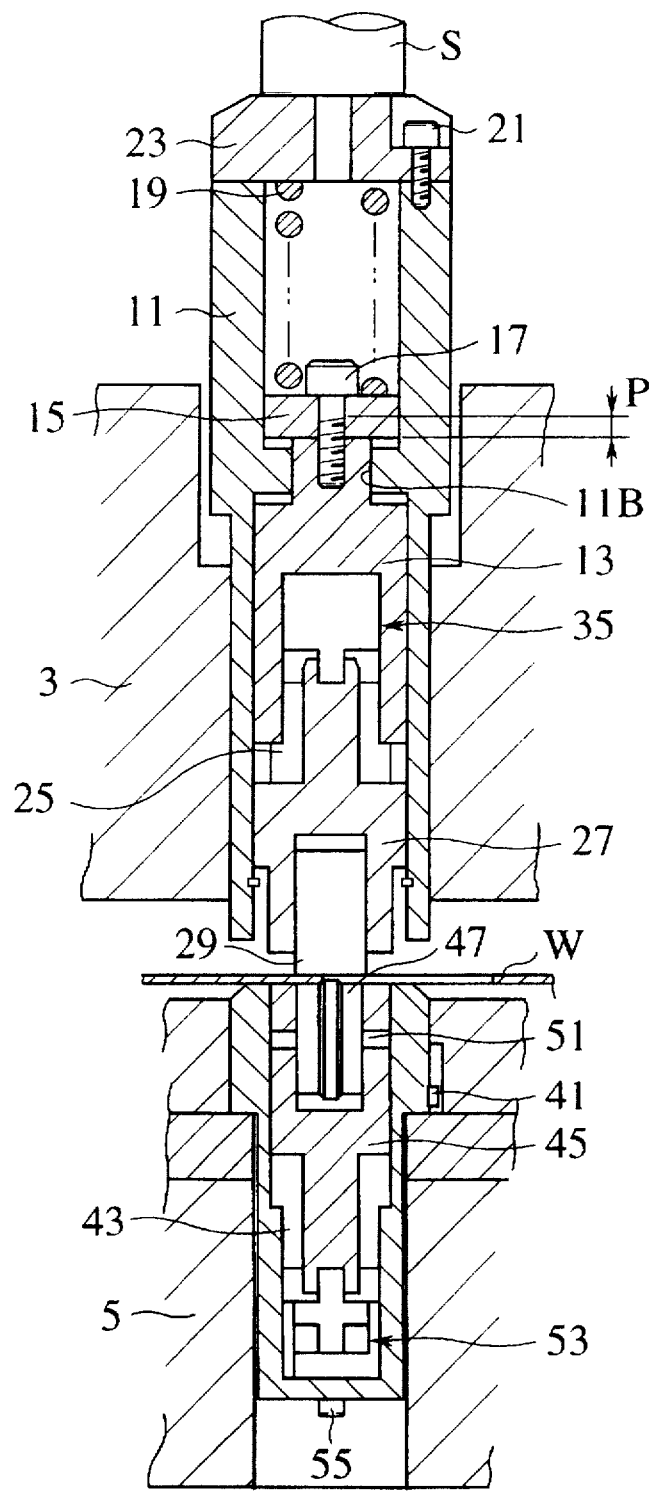
Figure 7:
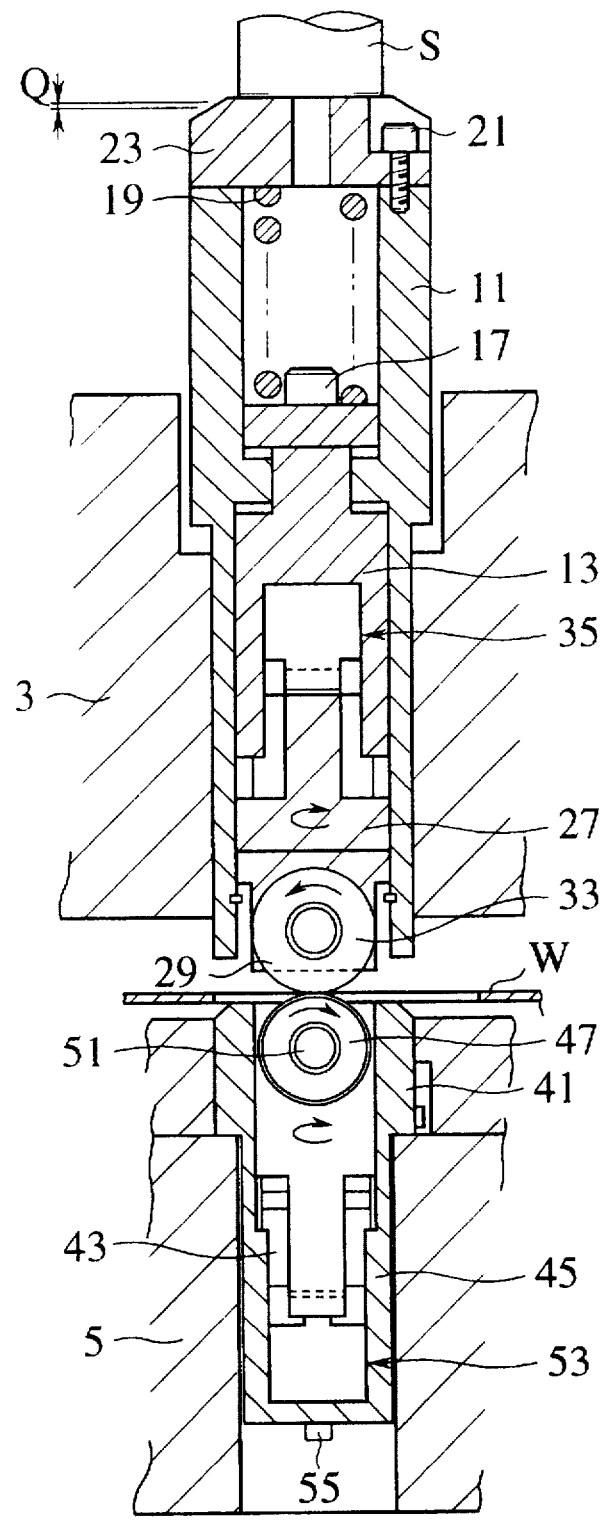
Figure 9:
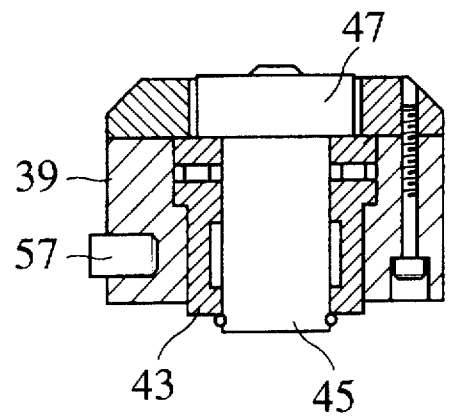
Figure 10:
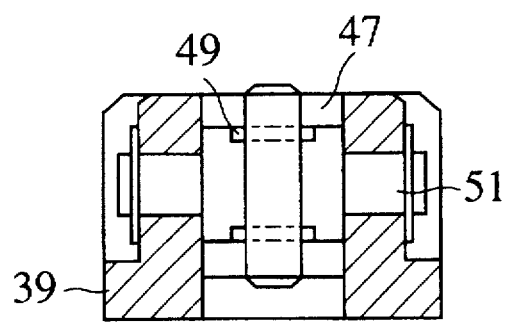

FIG. 3 is a view taken along line III—III in FIG. 2;

FIG. 4 is a front sectional view of another return unit instead of the return unit shown in FIG. 2;

each of FIGS. 5A and 5B is a cross-sectional view taken along line V—V in FIG. 4;

FIG. 6 is a view for explaining the operation of punching processing using a roll forming die;

FIG. 7 is a view for explaining the operation of punching processing using a roll forming die;

each of FIGS. 8A to 8E is an explanatory view in which various kinds of punching processings are performed by using various kinds of punch chips and die chips in the roll forming die;

FIG. 9 is a front sectional view of another lower die used instead of the lower die in FIG. 1 and performing burnishing by rotation with respect to only a vertical axis; and FIG. 10 is a front sectional view of the lower die for providing rotation only in a horizontal direction.

DESCRIPTION OF THE PREFERRED EMBODIMENTS

The embodiment forms of this invention will next be explained in detail with reference to the drawings.

With reference to FIG. 1, an upper turret 3 and a lower turret 5 are rotatably opposed to each other in a turret punch press 1. An upper die 7 and a lower die 9 are respectively mounted to this upper turret 3 and the lower turret 5.

A punch guide 11 constituting one portion of this upper die 7 is mounted to the upper turret 3 and can be moved upward and downward. Holes 11A, 11B and 11C each having a stepped shape are integrally formed within this punch guide 11 and extend through this punch guide 11 in a vertical direction. A punch driver 13 is mounted to the holes 11B and 11C. A flange 15 is attached to an upper portion of this punch driver 13 by a bolt 17.

A stripper spring 19 as a stripper resilient member is mounted into the hole 11A formed in the above punch guide 11. A punch head 23 is attached onto an upper face of the punch guide 11 by plural bolts 21.

In the above construction, the flange 15 attached to the upper portion of the punch driver 13 by the bolt 17 is held on an upper face of a stepped portion 11D of the punch guide 11 forming the hole 11B in a contact state at any time with downward biasing force of the stripper spring 19.

A punch chip holder 27 is rotatably arranged within the above punch driver 13, and can be rotated around the vertical axis through a bearing 25 with a thrust bearing. A punch chip 29 having a roller shape is rotatably supported in a lower portion within this punch chip holder 27 by a pin 33, and can be rotated around the horizontal axis through a needle roller bearing 31 having a shell shape. A return unit 35 is detachably attached to a lower portion within the above punch driver 13 by a bolt 37 so as to return the punch chip holder 29 to its origin position as an original position after the punch chip holder 29 is rotated around the vertical axis.

A die holder 39 constituting one portion of the lower die 9 is mounted to the above lower turret 5 and is fixed by a key 41. A die chip holder 45 is rotatably arranged within the above die holder 39, and can be rotated around the vertical axis through a bearing 43 with a thrust bearing. A die chip 47 having a roller shape is rotatably arranged in an upper portion within this die chip holder 45 by a pin 51, and can be rotated around the horizontal axis through a needle roller bearing 49 having a shell shape. A return unit 53 is detach-

4 ably attached to a lower portion within the above die holder 39 by a bolt 55 so as to return the die chip holder 45 to its origin position as an original position after the die chip holder 45 is rotated around the vertical axis. This return unit 53 is also fixed by a key 57. A striker S is arranged above the punch head 23 and can be moved upward and downward.

The above return units 35 and 53 are attached and used in a state in which vertical directions of these return units are opposed to each other. However, The return units 35 and 53 have the same structure. Accordingly, in the following description, only the return unit 53 will be explained and an explanation of the return unit 35 is omitted.

As shown in FIGS. 2 and 3, a body 59 having a cylindrical shape is attached to the die holder 39 by the bolt 55. An engaging member 61 having a cross shape in section is mounted into the body 59 and is stopped by a snap ring 64. A projecting portion 61U is projected in an upward direction of the above engaging member 61 and is engaged with a groove 45V formed in the die chip holder 45.

A pin 63 is arranged in a diametrical direction in a projecting portion 61D projected in a downward direction of the above engaging member 61. This pin 63 is movably arranged in a circumferential direction within a groove 59V formed in a circumferential direction of the above body 59. Further, a spring 65 is mounted to this groove 59V in a state in which the spring 65 supports the pin 63.

In the above construction, when the die chip holder 45 is rotated around the vertical axis, the engaging member 61 is also rotated in the same direction. Namely, the built-in spring 65 is compressed by the pin 63 by rotating the engaging member 61 so that the pin 63 is rotated until a position shown by a solid line in FIG. 3. Next, when the pressure is released, the pin 63 is pushed back by biasing force of the spring 65 until a position shown by a two-dotted chain line in FIG. 3. Thus, the pin 63 can be automatically returned to its origin position as an original position.

FIG. 4 and FIGS. 5A and 5B show an example of another embodiment form of the return unit 53. In FIG. 4 and FIGS. 5A and 5B, the same parts as FIGS. 2 and 3 are designated by the same reference numerals and an overlapped explanation thereof is omitted in the following description.

Namely, in FIG. 4 and FIGS. 5A and 5B, one end of the spring 65 is attached into the groove 59V formed in the above body 59 by a pin 67. The other end of the spring 65 is attached to one end of an attachment member 69 such as a thread, a wire, etc. The other end of this attachment member 69 is fixed to the engaging portion 61D of the above engaging member 61.

In the above construction, when the die chip holder 47 is rotated around the vertical axis as shown by an arrow in FIG. 5A, the engaging member 61 is also rotated in the same direction. Namely, the attachment member 69 is wound around the engaging portion 61D as shown in FIG. 5B by rotating the engaging member 61. The spring 65 is pulled and the engaging member 61 is rotated until the position of a two-dotted chain line in FIG. 5B. Next, when the pressure is released, the engaging member 61 is pushed back by biasing force of the spring 65 through the attachment member 69 until a position of FIG. 5A. Thus, the engaging member 61 can be automatically returned to its origin position as an original position.

For example, a movement of the roll forming die will be explained in a case in which a large hole $W_H$ is punched in a work W and the periphery of a lower face of this hole $W_H$ is then face-pushed (burnished). First, as shown in FIG. 1, the work W is placed on the die chip 47. Next, when the striker S is lowered and the punch head 23 is pressed, the punch guide 11 is lowered. Then, as shown in FIG. 6, the punch guide 11 is lowered and the stripper spring 19 is compressed until the punch chip 29 comes in contact with the work W. The stripper spring 19 is compressed until a flexing amount P. This state shows a lower dead point. Namely, the work W attains a state in which the work W is held between the punch chip 29 and the die chip 47.

From this state, the striker S is raised upward by a distance Q as shown in FIG. 7 and is then stopped. When the work W is moved in a horizontal direction in this state, the punch chip 29 and the die chip 47 are rotated as shown by respective arrows in FIG. 7 and are moved along the periphery of the hole $W_H$. Thus, face-pressing processing is performed around the lower face of the hole $W_H$. In the state of FIG. 7, the flexing amount of the stripper spring 19 is (P–Q).

When the face-pressing processing of the hole $W_H$ is terminated and the striker S is returned to the state of FIG. 1, the punch chip 29 and the die chip 47 are automatically returned to their origin positions by operating the return units 35 and 53.

Figure 8A:
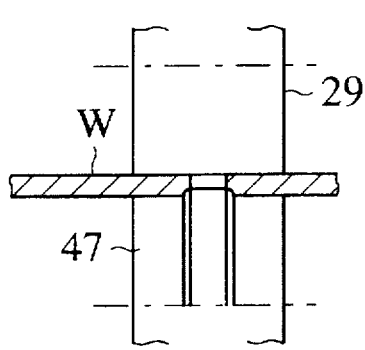
Figure 8B:
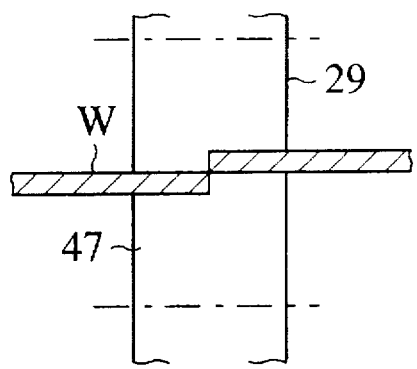
Figure 8C:
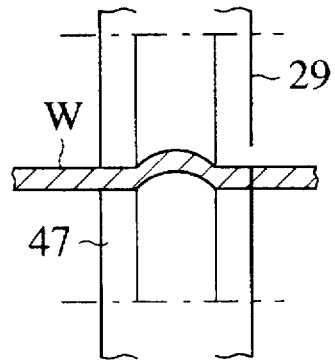
Figure 8D:
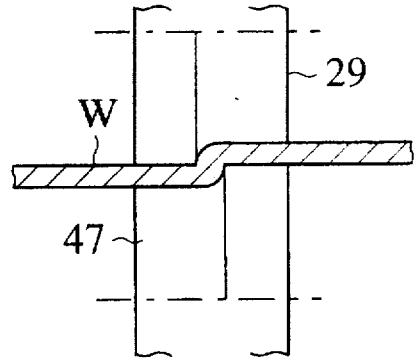
Figure 8E:
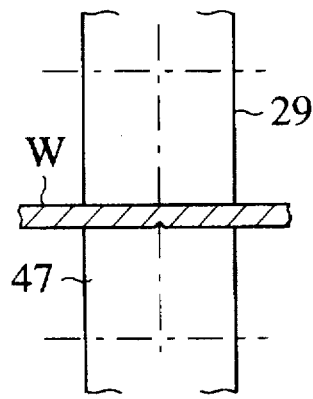

FIGS. 8A to 8E show states of the punch chip 29 and the die chip 47 for performing various kinds of punching processings by using this roll forming die. FIG. 8A shows an example of burnishing in which the work W is face-pushed. FIG. 8B shows an example of cutting in which the work W is cut. FIG. 8C shows an example of beading in which the work W is rib-molded. FIG. 8D shows an example of offset in which the work W is stepwise bent. FIG. 8E shows an example in which V-coining processing is performed with respect to the work W. Thus, punching processings of various kinds of shapes including processings of a circle and a curve in addition to processing of a straight line can be performed by using the roll forming die. Further, such punching processings can be performed for a short time without forming any seam.

The various kinds of punching processings shown in FIGS. 8A to 8E can be performed by exchanging the punch chip 29 and the die chip 47.

FIG. 9 shows an example of another embodiment form of the lower die 9. In FIG. 9, the die chip 47 is not rotated around the horizontal axis with respect to the lower die 9 shown in FIG. 1 and burnishing is performed by rotating the die chip 47 around only the vertical axis.

FIG. 10 shows an example of another embodiment form of the lower die 9. In FIG. 10, the die chip 47 is not rotated around the vertical axis with respect to the lower die 9 shown in FIG. 1. When this lower die 9 is used, a fixed block is used instead of the return unit 35 in FIG. 1 with respect to the structure of the upper die 7, and the punch chip holder 27 is fixedly used in the punch driver 13.

This invention is not limited to the above embodiment forms, but can be embodied in another forms by suitable changes.

What is claimed is:

1. A roll forming die comprising:
    an upper die including a punch chip holder and a punch chip;
    the punch chip holder arranged in a punch driver and rotatable about a vertical axis;
    the punch chip arranged in the punch chip holder and having a roller shape rotatable about a horizontal axis;
    a lower die including a die chip holder and a die chip;
    the die chip holder arranged in a die holder and rotatable about the vertical axis;
    the die chip arranged in the die chip holder and having a roller shape rotatable about the horizontal axis;
    return units respectively detachably attached to the punch driver and the die holder; and
    the return units returned to their original positions by releasing pressurization after the punch chip holder and the die chip holder are respectively rotated about the vertical axis.

2. The roll forming die as claimed in claim 1, wherein the punch chip and the die chip having a roller shape are exchangeably arranged respectively in said punch chip holder and said die chip holder.

3. The roll forming die as claimed in claim 1 wherein said return units including a body arranged in said punch driver and said die holder, a rotatable engaging member engaged with said punch chip holder and said die chip holder, and a resilient member for returning the engaging member to its original position after the engaging member is rotated with respect to said body.

4. A punching processing method in which a punch chip holder is arranged in a punch driver and rotatable about a vertical axis, a punch chip is arranged in the punch chip holder and has a roller shape rotatable about a horizontal axis, a die chip holder is arranged in a die holder and rotatable about the vertical axis, a die chip is arranged in the die chip holder and has a roller shape rotatable about the horizontal axis, return units are respectively detachably attached to the punch driver and the die holder, and the return units are returned to their original positions by releasing pressurization after the punch chip holder and the die chip holder are respectively rotated about the vertical axis; said method comprising the step of:
    punching processing of a workpiece which is performed, in cooperation with the punch chip and the die chip, by moving the workpiece in the horizontal direction in a state in which the workpiece is held between the punch chip and the die chip.

* * * * *